United States Patent
Ellis et al.

(10) Patent No.: US 8,719,314 B2
(45) Date of Patent: May 6, 2014

(54) FACETED SEARCH ON ASSETS PACKAGED ACCORDING TO THE REUSABLE ASSET SPECIFICATION (RAS)

(75) Inventors: Jonathan Y. Ellis, Philadelphia, PA (US); Gili Mendel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1245 days.

(21) Appl. No.: 12/047,968

(22) Filed: Mar. 13, 2008

(65) Prior Publication Data

US 2009/0234864 A1 Sep. 17, 2009

(51) Int. Cl.
*G06F 17/30* (2006.01)

(52) U.S. Cl.
USPC .......................................... 707/803; 707/796

(58) Field of Classification Search
USPC .................................. 707/803, 796
See application file for complete search history.

(56) References Cited

U.S. PATENT DOCUMENTS

| | | | |
|---|---|---|---|
| 6,446,061 B1 * | 9/2002 | Doerre et al. ................. | 707/738 |
| 6,785,689 B1 * | 8/2004 | Daniel et al. ................. | 707/754 |
| 7,502,810 B2 * | 3/2009 | Acevedo-Aviles et al. ...... | 707/999.102 |
| 7,689,625 B2 * | 3/2010 | Westerinen et al. .......... | 707/778 |
| 7,730,059 B2 * | 6/2010 | Behnen et al. ................. | 707/722 |
| 7,774,383 B2 * | 8/2010 | Acevedo-Aviles et al. ... | 707/805 |
| 8,086,994 B2 * | 12/2011 | O'Connell et al. ........... | 717/104 |
| 8,234,634 B2 * | 7/2012 | Coqueret et al. ............. | 717/144 |
| 8,266,581 B2 * | 9/2012 | Brandt et al. ................. | 717/106 |
| 2006/0271565 A1 * | 11/2006 | Acevedo-Aviles et al. ... | 707/100 |
| 2006/0288039 A1 * | 12/2006 | Acevedo-Aviles et al. .......... | 707/104.1 |
| 2007/0022403 A1 * | 1/2007 | Brandt et al. ................. | 717/100 |
| 2007/0185836 A1 * | 8/2007 | Handy-Bosma et al. ......... | 707/3 |
| 2008/0243778 A1 * | 10/2008 | Behnen et al. .................... | 707/3 |

OTHER PUBLICATIONS

Reusable Asset Specification, Object Management Group, Oct. 2004.*

* cited by examiner

*Primary Examiner* — Debbie Le
(74) *Attorney, Agent, or Firm* — Patents on Demand P.A.; Brian K. Buchheit; Scott M. Garrett (57) ABSTRACT

The present invention discloses a solution for allowing the performance of a faceted search upon assets packaged according to the Reusable Asset Specification (RAS). Such a solution can include the creation of asset classification schemas. An asset classification schema can define hierarchical relationships between a classification name and a multitude of descriptive attributes. Then, a consolidated faceted search schema can be generated from the asset classification schemas, which can be used by a faceted search engine to perform faceted searches on the assets.

20 Claims, 4 Drawing Sheets

Sample Consolidation Algorithm 500

| | |
|---|---|
| 505 | foreach AssetClassificationSchema as schema |
| 510 |    add schema classification name to the Classification facet |
| 515 |    foreach top-level descriptive attribute in schema |
| 520 |       find facet with top-level descriptive attribute name |
| 525 |       if facet does not exist |
| 530 |          create facet |
| 535 |       foreach specific descriptive attribute child of top-level descriptive attribute |
| 540 |          find attribute child with specific descriptive attribute name |
| 545 |          if attribute child does not exist |
| 550 |             create attribute child |
| 555 |          foreach specific descriptive attribute child of specific descriptive attribute |
| 560 |             find attribute child of facet item with specific descriptive attribute name |
| 565 |             if attribute child does not exist |
| 570 |                create attribute child |
| |                . |
| |                . |
| |                . |

FIG. 5

FACETED SEARCH ON ASSETS PACKAGED ACCORDING TO THE REUSABLE ASSET SPECIFICATION (RAS)

BACKGROUND OF THE INVENTION

The present invention relates to the field of asset management and, more particularly, to performing a faceted search upon assets packaged according to the Reusable Asset Specification (RAS).

Conventional keyword or textual searches are commonplace among many software applications. However, such searches lack flexibility and require that a user enter an exact word or phrase in order to find the desired document or item. Thus, a new approach to searching large catalogs of related items has emerged called a faceted search. Common areas where faceted searches are found are in large Web-based storefronts, where a customer can adjust product search results based on price categories or brands.

The business area of asset management typically collects a large quantity of corporate assets. At present, asset management systems only support keyword and/or textual-based searches. The usability and efficiency of an asset management system could be greatly improved by the introduction of a faceted search capability.

Unlike conventional keyword and textual searches, a faceted search allows a user to broaden and/or narrow the scope of their search based upon an underlying set of hierarchical relationships between terms. The underlying set of hierarchical relationships and associated terms is typically in the form of an ontology. Although effective, the ontology often consists of a large quantity of complex relationships, which typically requires a time-consuming manual process to develop and maintain.

BRIEF SUMMARY OF THE INVENTION

One aspect of the present invention can include a method for allowing the performance of a faceted search upon assets packaged according to the Reusable Asset Specification (RAS). Such a method can include the creation of asset classification schemas. An asset classification schema can define hierarchical relationships between a classification name and a multitude of descriptive attributes. Then, a consolidated faceted search schema can be generated from the asset classification schemas, which can be used by a faceted search engine to perform faceted searches on the assets.

Another aspect of the present invention can include a system that allows a faceted search to be performed on assets packaged according to the Reusable Asset Specification (RAS). Such a system can include asset classification schemas and a schema consolidator. An asset classification schema can define hierarchical relationships between a classification name and descriptive attributes that describe an asset. The schema consolidator can be configured to generate a consolidated faceted search schema, representing a hierarchical compilation of the asset classification schemas.

Yet another aspect of the present invention can include a faceted search component for an asset management system. The faceted search component can include asset classification schemas, a schema consolidator, and a faceted search engine. An asset classification schema can define hierarchical relationships between a classification name and descriptive attributes that describe assets. The schema consolidator can be configured to generate a consolidated faceted search schema from the asset classification schemas. The faceted search engine can be configured to utilize the consolidated faceted search schema to perform a faceted search on the assets.

DETAILED DESCRIPTION OF THE INVENTION

The disclosed invention allows for the performance of faceted searches upon the assets in an asset management system. That is, the solution can dynamically create conditions necessary for a faceted search to be conducted within an asset management system.

In one implementation, the disclosed solution can utilize descriptive attributes associated with assets that are packaged in accordance with the Reusable Asset Specification (RAS). The implementation can leverage descriptive attributes entered in the classification section of a RAS-packaged asset's manifest document. An asset classification schema can be created that defines one or more hierarchical relationships between these descriptive attributes. A schema consolidator can then be used to generate a consolidated faceted search schema from all the available asset classification schemas. The consolidated faceted search schema can then be used by a faceted search engine to perform faceted searches upon the RAS-packaged assets.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
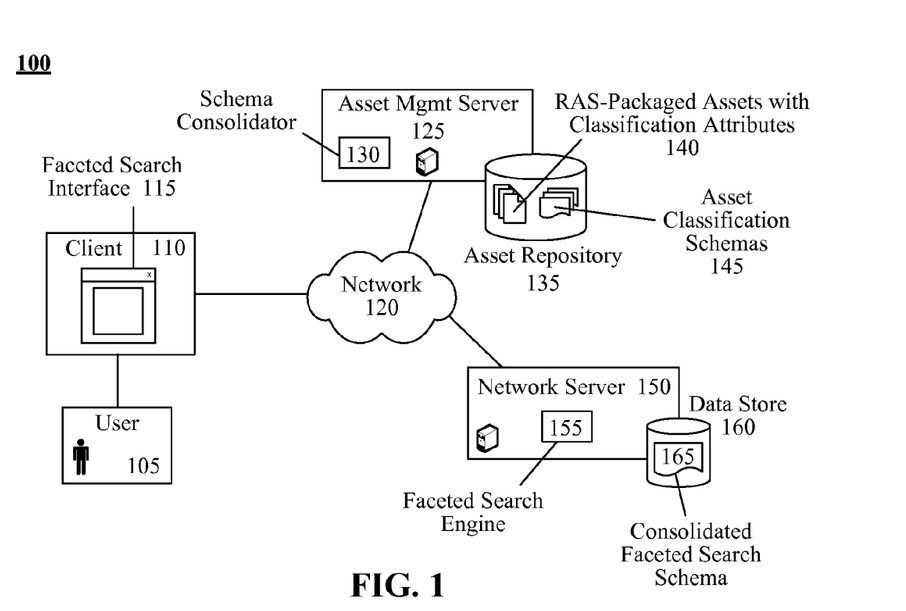
FIG. 1 is a schematic diagram illustrating a system that allows the performance of a faceted search upon assets packaged according to the Reusable Asset Specification (RAS) in accordance with embodiments of the inventive arrangements disclosed herein.

FIG. 1 is a schematic diagram illustrating a system 100 that allows the performance of a faceted search upon assets 140 packaged according to the Reusable Asset Specification (RAS) in accordance with embodiments of the inventive arrangements disclosed herein. In system 100, asset classification schemas 145 can be used to generate a consolidated faceted search schema 165, which can then be used in conjunction with a faceted search engine 155 to allow a user 105 to perform a faceted search upon assets 140 that are packaged in accordance with the RAS and that contain classification attributes.

It should be noted that although the RAS standard has been referenced throughout the present document, the invention can easily be adapted to function with any other asset classification schema. Thus, the RAS standard is intended to serve as an example of a mechanism for packaging assets 140 in a re-usable manner, which stores internal classification information for each of the assets. The scope of the disclosed solution concerns leveraging this classification information to search for these assets in a faceted manner. That is, the disclosed solution converts one or more pre-existing classification schema 145 into a facet schema 165 for faceted searching purposes. In one embodiment, the conversion to a faceted search schema 165 can occur dynamically and the faceted schema 165 can be updated in real-time as the classification schemas 145 change.

System 100 takes advantage of a fact that all assets 140 packaged in accordance with the RAS (or other similar standard adapted for purposes of the faceted search schema) have an associated manifest that contains a variety of information about the asset. As outlined in the RAS, the manifest document can include a classification section to contain one or more descriptive attributes that can be used for keyword and/or textual search purposes.

Although conventional keyword and/or textual searches can be performed upon the descriptive attributes of RAS-packaged assets 140, the robust features of a faceted search engine 155 requires more than words; it requires hierarchical relationships between the descriptive attributes. Thus, a faceted search engine 155 cannot perform a faceted search upon RAS-packaged assets 140 directly, which is why the faceted search schema 165 is generated and utilized. Appreciably, the faceted search engine 155 can, unlike traditional searches, permit users 105 to refine a search by the type of asset, by a rating level, by a review process state, by a classification, and by other characteristics or attribute of the asset, which is maintained in repository 135.

An asset classification schema 145 can be an electronic document that defines the hierarchical relationships of the descriptive attributes for the RAS-packaged assets 140. Multiple asset classification schemas 145 can exist to accommodate various types of assets 140 and can include overlapping attributes and/or hierarchies. For example, there may be an asset classification schema for Internal Service-Oriented Architecture (SOA) Assets and one for general Solution Assets. Both asset classification schemas 140 can include a grouping of descriptive attributes related to Geography, though the attributes underneath the Geography grouping may vary.

The descriptive attributes used in the classification section of a RAS-packaged asset 140 must correspond to entries within at least one of the asset classification schemas 145. That is, the asset classification schemas 145 should encompass a majority of the descriptive attributes already in use, or a majority of descriptive attributes defined in asset classification schemas 145 should be used to classify the RAS-packaged assets 140. A disconnect between the contents of the classification section of the RAS-packaged assets 140 and the asset classification schemas 145 can lead to ineffectual searches.

Since multiple asset classification schemas 145 can exist for a group of RAS-packaged assets 140, using only one of the asset classification schemas 145 to conduct a faceted search would provide an incomplete search. Therefore, it can be concluded that a hierarchical compilation of the entire set of asset classification schemas 145 can provide the most complete faceted search upon the RAS-packaged assets 140.

A schema consolidator 130 can be a software application running on an asset management server 125 configured to compile asset classification schemas 145 into a single consolidated faceted search schema 165. In an alternate embodiment, the schema consolidator 130 can operate from another server (not shown) that is communicatively linked via the network 120 to the asset repository 135 containing the asset classification schemas 145. In another embodiment, the asset classification schemas 145 can be stored in a data store (not shown) on another server (not shown) that is accessible over the network 120.

The consolidated faceted search schema 165 produced by the schema consolidator 130 can be stored in a data store 160 of a network server 150. The network server 150 can also include the faceted search engine 155. Alternately, the consolidated faceted search schema 165 can be stored another data store (not shown) that is accessible to both the schema consolidator 130 and the faceted search engine 155 over the network 120.

Once the consolidated faceted search schema 165 is generated, a user 105 can use a faceted search interface 115 on a client device 110 to perform a faceted search of the RAS-packaged assets 140. The faceted search interface 115 can represent a standard user interface that can be configured for handling faceted search operations. It should be noted that the faceted search interface 115 must be compatible for operation on the specific client device 110 being used.

It should be noted that RAS is standard originally created by the OBJECT MANAGEMENT GROUP (OMG) to package and define reusable software assets. The specification provides formality by which to package assets for reuse within a company's business unit or across companies. The RAS can be extended with Classification schemas, such as schemas 145.

It is expected that the RAS standard will grow and change. For purposes of the disclosed invention, any standard derived from RAS principles or based in part upon RAS specification is to be considered an RAS standard. This includes open RAS-like standards and proprietary RAS-like standards. In other words, "RAS" is used generally herein as a standard that is used to package a set of digital artifacts, which formally defines a manner of packaging an asset and provides a standard repository (e.g., repository 135) interface. This "RAS" standard can allow for a creation of toolset that can package and manipulate a variety of assets along with a set of one or more repository, which can be searched to provide information about those assets. Moreover, although the RAS standard is contemplated in one embodiment, the solution disclosed in system 100 can be adapted for other standards. Therefore it is contemplated that faceted searches can be performed by leveraging categorization information from any standard (RAS based or otherwise) so long as a pre-existing classification schema is able to be converted into a faceted search schema, which is able to be used for searching purposes by engine 155.

The presented data stores, including stores 135 and 160, can be a physical or virtual storage space configured to store digital information. Data stores 135 and 160 can be physically implemented within any type of hardware including, but not limited to, a magnetic disk, an optical disk, a semiconductor memory, a digitally encoded plastic memory, a holographic memory, or any other recording medium. Each of the data stores 135 and 160 can be a stand-alone storage unit as well as a storage unit formed from a plurality of physical devices. Additionally, information can be stored within data stores 135 and/or 160 in a variety of manners. For example, information can be stored within a database structure or can be stored within one or more files of a file storage system, where each file may or may not be indexed for information searching purposes. Further, data stores 135 and/or 160 can utilize one or more encryption mechanisms to protect stored information from unauthorized access.

Network 120 can include any hardware, software, and/or firmware necessary to convey data encoded within carrier waves. Data can be contained within analog or digital signals and conveyed through data or voice channels. Network 120 can include local components and data pathways necessary for communications to be exchanged among computing device components and between integrated device components and peripheral devices. Network 120 can also include network equipment, such as routers, data lines, hubs, and intermediary servers which together form a data network, such as the Internet. Network 120 can also include circuit-based communication components and mobile communication components, such as telephony switches, modems, cellular communication towers, and the like. Network 120 can include line based and/or wireless communication pathways.

Figure 2:
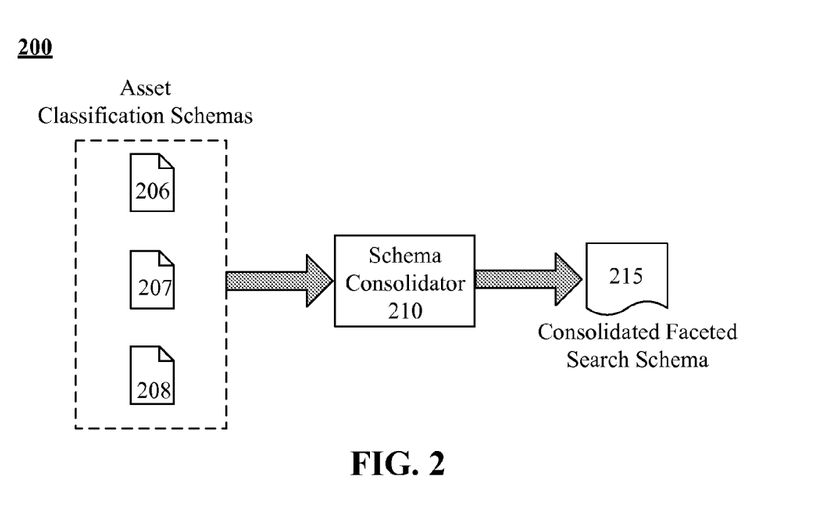
FIG. 2 is a schematic diagram of an illustration depicting the creation of a consolidated faceted search schema in accordance with an embodiment of the inventive arrangements disclosed herein.

FIG. 2 is a schematic diagram of an illustration 200 depicting the creation of a consolidated faceted search schema 215 in accordance with an embodiment of the inventive arrangements disclosed herein. Illustration 200 can be performed in the context of system 100 or any other system supporting the generation of a consolidated faceted search schema for the performance of a faceted search upon RAS-packaged assets.

In illustration 200, asset classification schemas 206, 207, and 208 can be input into a schema consolidator 210 to produce a consolidated faceted search schema 215. The schema consolidator 210 can consolidate the contents of the asset classification schemas 206, 207, and 208 into a single consolidated faceted search schema 215.

The hierarchy and terms used in the asset classification schemas 206, 207, and 208 can be transcribed into the consolidated faceted search schema 215. Further, the schema consolidator 210 can include logic such that hierarchies and/or terms common to multiple asset schemas 206, 207, and 208 are not duplicated within the consolidated faceted search schema 215.

For example, if all of the asset classification schemas 206, 207, and 208 contain a branch called "Customer" at the same tree level, then the consolidated faceted search schema will only contain one Customer branch at that tree level.

In system 200, any number (e.g., one to N) of asset classification schemas 206-208 (e.g., RAS based classification schemas, for example) can be merged into a single faceted search schema 215 that is able to be used for all repository searching. In one embodiment, branches of classification schemas 206-208 that share ancestry are merged into one tree of a of the facet schema 215. This can permit users to search for assets that are classified similarly, but across different classification schemas 206-208. Additionally, in one implementation, the classification schemas 206-208 themselves are added or associated with the schema 215 that allows for filtering of the available facets for any given search. The result is that the entire amount of classification information contained in the schemas 206-208 is presented to a user about each asset in a searchable repository through use of the consolidated faceted search schema 215.

It should be noted that the schemas 206-208 can be created/updated/deleted on a repository. When this occurs, the schema consolidator 210 can automatically update the consolidated faceted search schema 215 in real-time (or after a slight delay depending upon programmatic implementation). In other words, when the classification schemas 206-208 change, updates can be automatically made to the faceted search schema 215 without human intervention, which permits searches to always be performed using current information contained in the faceted search schema 215. Hence, unlike solutions dependent upon classic ontology mapping that need to be manually maintained, the searching mechanisms based upon the consolidated faceted search schema 215 are self-maintaining since they change as the asset classification schemas 206-208 change.

Figure 3:
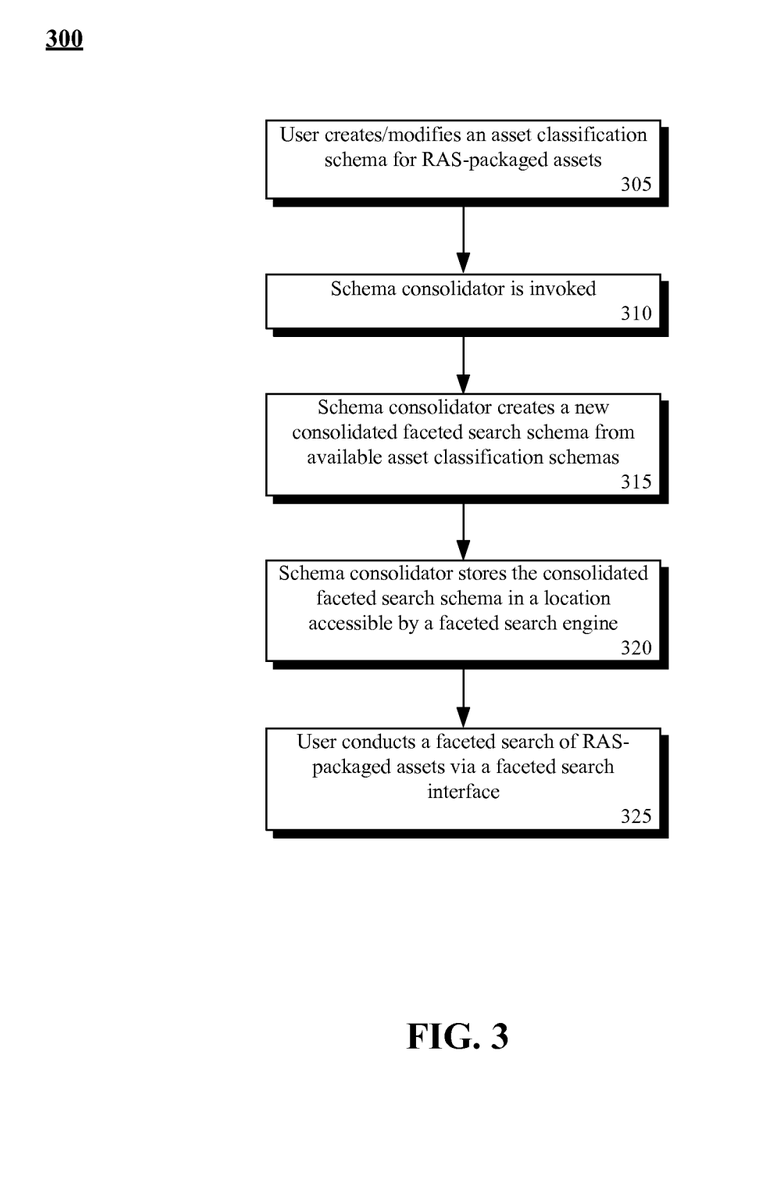
FIG. 3 is a flow chart of a method for performing a faceted search upon RAS-packaged assets in accordance with an embodiment of the inventive arrangements disclosed herein.

FIG. 3 is a flow chart of a method 300 for performing a faceted search upon RAS-packaged assets in accordance with an embodiment of the inventive arrangements disclosed herein. Method 300 can be performed in the context of system 100 or any other system supporting the generation of a consolidated faceted search schema for the performance of a faceted search upon packaged assets having associated classification information, which can be converted into faceted search information.

Method 300 can begin in step 305 where a user can create and/or modify an asset classification schema for RAS-packaged assets (or assets conforming to a RAS based standard or other standard permitting an internal classification scheme). In step 310, the schema consolidator can be invoked. Invocation of the schema consolidator in step 310 can occur in a variety of means, including, but not limited to, a manual invocation, an automatic scheduled process invocation, and an automatic triggered event invocation.

Examples of such invocations can include a user can directly run the schema consolidator as in launching a software application, a user-created process that is set to run at a user-defined time and time interval (i.e., schema consolidator is run daily at 10:00 pm), and a background process identifies a change in the quantity of or a modification date of the asset classification schemas and invokes the schema consolidator.

It is also important to note that the invocation of the schema consolidator, whether manual or automatic, can allow for changes in the underlying asset classification schemas to be reflected in the consolidated faceted search schema than conventional ontology-based faceted search systems.

In step 315, the schema consolidator can create a new consolidated faceted search schema from the available asset schemas. It should be noted that by creating a new consolidated faceted search schema at each invocation can ensure that any hierarchical changes to the asset classification schemas are properly accounted for in the consolidated faceted search schema.

The schema consolidator can store the generated consolidated faceted search schema in a location that is accessible by a faceted search engine in step 320. In step 325, the user can conduct a faceted search for RAS-packaged assets using a faceted search interface.

Figure 4:
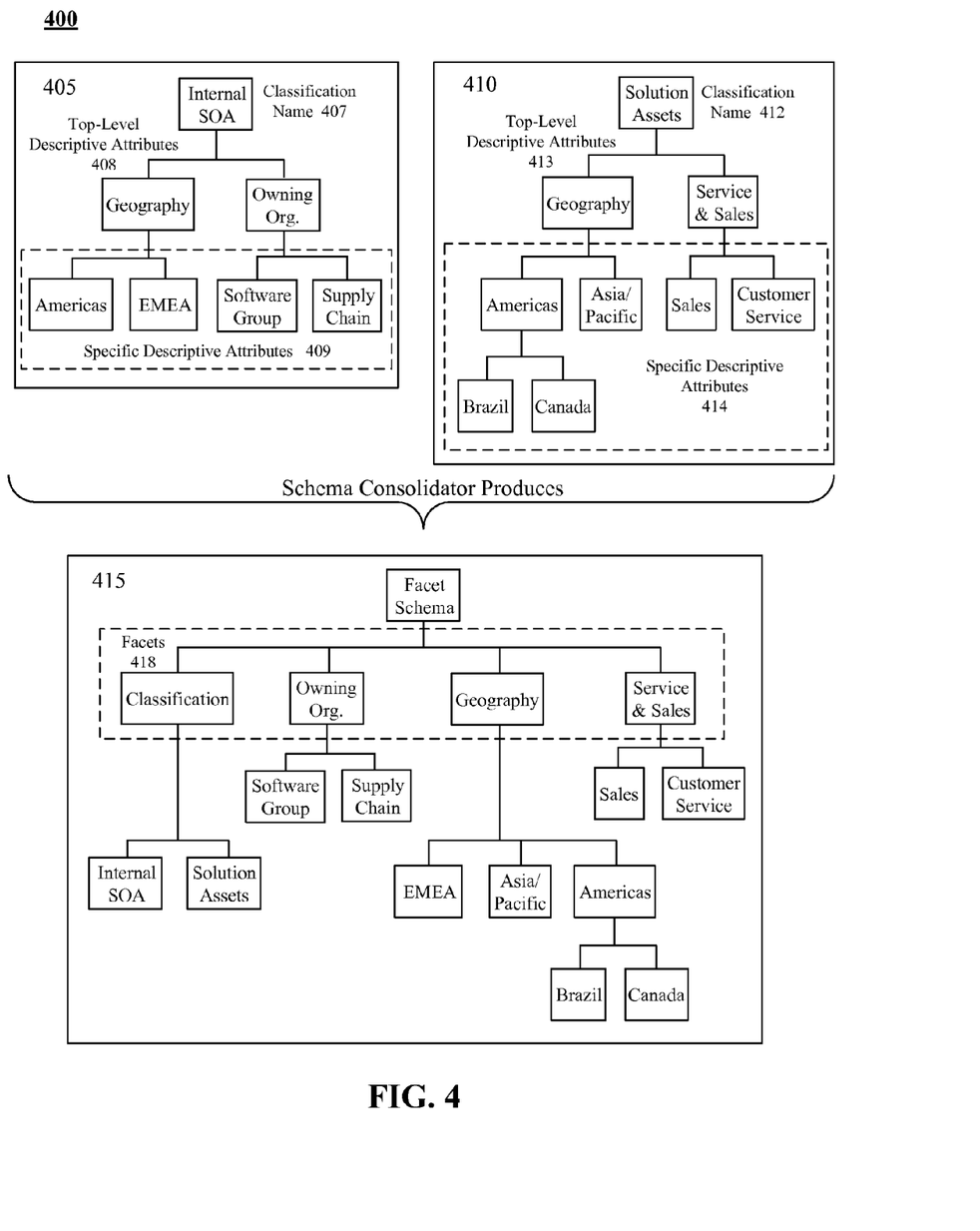
FIG. 4 is an illustration depicting an example generation of a consolidated faceted search schema in accordance with an embodiment of the inventive arrangements disclosed herein.

FIG. 4 is an illustration 400 depicting an example generation of a consolidated faceted search schema 415 in accordance with an embodiment of the inventive arrangements disclosed herein. The example generation shown in illustration 400 can be conducted within the context of system 100 and/or created during the execution of method 300. It should be noted that the terms used in illustration 400 are for illustrative purposes only and are not meant as a limitation or absolute implementation of the present invention.

Illustration 400 can contain two sample asset classification schemas 405 and 410. The general components of an asset classification schema can include a classification name, one or more top-level descriptive attributes, and one or more specific descriptive attributes.

Sample asset classification schema 405 can have a classification name 407 of "Internal SOA". The classification name 407 can be the overarching descriptive attribute describing the contents of the asset classification schema 405.

The asset classification schema 405 can have one or more top-level descriptive attributes 408 directly subordinate to the classification name 407. As shown in this example, assets falling under the "Internal SOA" schema 405 can be furthered grouped by the top-level descriptive attributes 408 of "Geography" and "Owning Organization".

A top-level descriptive attribute 408 can have one or more specific descriptive attributes 409. A specific descriptive attribute 409 can represent an individual term directly related to the associated top-level descriptive attribute 408. As shown in this example, the top-level descriptive attribute 408 of "Geography" has two specific descriptive attributes 409 of "Americas" and "EMEA".

The second sample asset classification schema 410 can have a classification name of "Solution Assets". The top-level descriptive attributes 413 of this asset classification schema 410 can include "Geography" and "Service and Sales". Similar to the first schema 405, each of the top-level descriptive attributes 413 can have one or more specific descriptive attributes 414.

Of particular note in asset classification schema 410 is the specific descriptive attributes 414 of the top-level descriptive attribute 413 "Geography". In schema 410, the specific descriptive attribute 414 of "Americas" has additional subordinate specific descriptive attributes 414 of "Brazil" and "Canada". While all of these terms are specific descriptive attributes 414, the asset classification schema 410 can capture these additional lower-level hierarchical relationships.

Using these two sample asset classification schemas 405 and 410, a schema consolidator can produce a consolidated faceted search schema 415. The consolidated faceted search schema 415 can represent a hierarchical compilation of the original schemas 405 and 410.

The consolidated faceted search schema 415 can include a set of facets 418. The facets 418 can include a "Classification" facet to capture the classification names 407 and 412 of the original asset classification schemas 405 and 410 as well as a consolidated listing of the top-level descriptive attributes 408 and 413 of those schemas 405 and 410.

It is important to note that the top-level descriptive attribute 408 and 413 of "Geography", though common to both asset classification schemas 405 and 410, is listed only once in the consolidated faceted search schema 415. Further, the shared specific descriptive attribute 409 and 414 of "Americas" contains the additional subordinate specific descriptive attributes 414 from the second sample schema 410.

Figure 5:
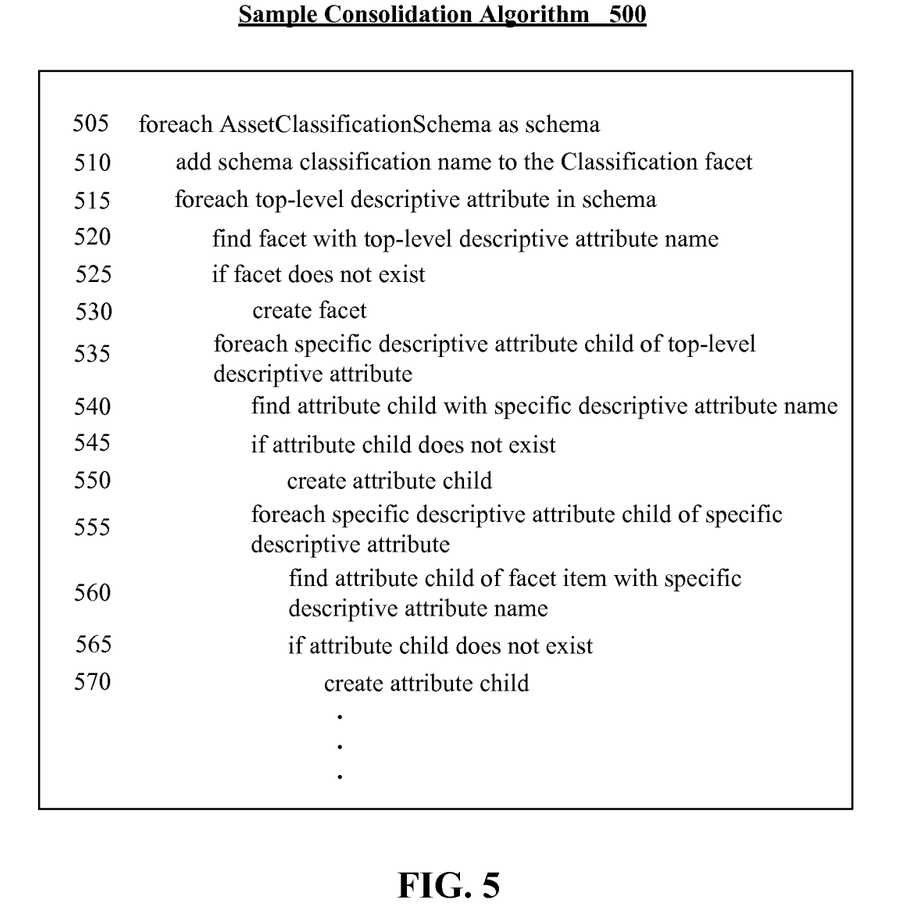
FIG. 5 is a sample consolidation algorithm in accordance with an embodiment of the inventive arrangements disclosed herein.

FIG. 5 is a sample consolidation algorithm 500 in accordance with an embodiment of the inventive arrangements disclosed herein. Sample consolidation algorithm 500 can be utilized by a schema consolidator within the context of system 100 and/or method 300 and/or illustration 400. It should be noted that the contents of the sample consolidation algorithm 500 are in pseudo-code and are for illustrative purposes only.

Sample consolidation algorithm 500 can begin with line 505 that starts a loop structure that can be repeated for each asset classification schema. According to line 510, the classification name of the schema can be added to the Classification facet. Another loop structure can begin in line 515 to be repeated for each top-level descriptive attribute in the asset classification schema.

In line 520, the consolidated faceted search schema can be examined to determine if a facet with the same name as the top-level descriptive attribute already exists. Line 525 can evaluate the existence of the facet with the same name. If line 525 evaluates as FALSE, meaning that a facet already exists with this name, then nothing needs to happen. If line 525 evaluates as TRUE, then line 530 can execute to create a facet in the consolidated faceted search schema with the name of the top-level descriptive attribute.

In line 535, another loop structure can begin that repeats for each specific descriptive attribute child of the top-level descriptive attribute. That is, the loop can be repeated for each specific descriptive attribute in the asset classification schema that is directly subordinate to the top-level descriptive attribute. In line 540, the consolidated faceted search schema can be examined to determine if an attribute child of the facet with the same name as the top-level descriptive attribute already exists.

Line 545 can evaluate the existence of such an attribute child for the facet. If line 545 evaluates as FALSE, meaning that an attribute child already exists with this name for the facet, then nothing needs to happen. If line 545 evaluates as TRUE, then line 550 can execute to create an attribute child with the name of the specific descriptive attribute for the facet in the consolidated faceted search schema.

Lines 555 through 570 can repeat a similar loop for additional specific descriptive attributes that are hierarchically subordinate to the processed specific descriptive attributes. The sample consolidation algorithm 500 can be expanded upon with additional nesting of similar loop structures in order to handle a predetermined depth of an asset classification schema.

In summary, the sample consolidation algorithm 500 can systematically traverse the hierarchical tree structure of an asset classification schema and transcribe the contents of the asset classification schema into the consolidated faceted search schema in the proper hierarchical order.

The diagrams in FIGS. 1-5 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for allowing the performance of a faceted search upon assets comprising:
   identifying, by at least one processor executing computer program instructions stored in a storage medium, a plurality of asset classification schemas, wherein each of the plurality of asset classification schemas defines hierarchical relationships between a classification name and a plurality of descriptive attributes, wherein the plurality of descriptive attributes are used to describe at least one asset, and wherein the plurality of asset classification schemas contain different descriptive attributes between the plurality of asset classification schemas;

generating, by at least one processor executing computer program instructions stored in a storage medium, a consolidated faceted search schema from the plurality of asset classification schemas, wherein the consolidated faceted search schema consolidates the hierarchical relationships of each of the plurality of asset classification schemas without duplication of attributes at corresponding hierarchic levels; and conducting a faceted search to produce search results according to the consolidated faceted search schema.

2. The method of claim 1, wherein the asset is packaged in accordance with a defined standard, and wherein the classification schema is a schema specified by the standard.

3. The method of claim 2, wherein the defined standard is based upon a Reusable Asset Specification (RAS) standard.

4. The method of claim 1, further comprising:
accessing, via computer program instructions stored in a storage medium being executed by at least one processor, the plurality of asset classification schemas;
transcribing, via computer program instructions stored in a storage medium being executed by at least one processor, a classification name of each of the plurality of asset classification schemas as an attribute of a classification facet;
determining, via computer program instructions stored in a storage medium being executed by at least one processor, whether each descriptive attribute of the plurality of asset classification schemas exists within the consolidated faceted search schema while generating the consolidated faceted search schema; and
when a descriptive attribute is nonexistent, in response to the determining, adding, via computer program instructions stored in a storage medium being executed by at least one processor, said descriptive attribute to the consolidated faceted search schema.

5. The method of claim 1, further comprising filtering the search results according to the consolidated faceted search schema.

6. The method of claim 1, wherein at least one of the plurality of descriptive attributes is contained within a classification section comprising a manifest document of the at least one asset.

7. A system that allows a faceted search to be performed on assets packaged according to a standard for packaging reusable assets comprising:
a plurality of asset classification schemas, stored in a storage medium, each of the plurality of asset classification schemas defining hierarchical relationships between a classification name and a plurality of descriptive attributes, wherein the plurality of descriptive attributes are used to describe at least one asset packaged according a standard for packaging reusable assets, and wherein the plurality of asset classification schemas contain different descriptive attributes between the plurality of asset classification schemas;
a schema consolidator, implemented by a computing device including at least one processor, wherein said schema consolidator generates a consolidated faceted search schema, wherein the consolidated faceted search schema represents a hierarchical compilation of the a plurality of asset classification schemas without duplication of descriptive attributes; and
a faceted search engine that is implemented by a computing device including at least one processor and that conducts a faceted search to produce search results according to the consolidated faceted search schema.

8. The system of claim 7, further comprising:
a faceted search interface configured to accept at least one user-entered search criteria and to present the search results for the faceted search.

9. The system of claim 8, wherein the faceted search interface is configured to permit the search results to be filtered according to the consolidated faceted search schema.

10. The system of claim 7, wherein the standard for packaging reusable assets conforms to a Reusable Asset Specification (RAS) based standard.

11. The system of claim 7, wherein at least one of the plurality of descriptive attributes is contained within a classification section of a manifest document of the at least one asset.

12. The system of claim 7, wherein each asset classification schema categorizes the plurality of descriptive attributes as at least one of a top-level descriptive attribute and a specific descriptive attribute, wherein the top-level descriptive attribute is directly subordinate to the classification name, and, wherein the specific descriptive attribute is subordinately related to the top-level descriptive attribute.

13. The system of claim 12, wherein the schema consolidator is configured to transcribe the classification name and top-level descriptive attributes as facets in the consolidated faceted search schema.

14. The system of claim 7, wherein the schema consolidator is configured to dynamically create the consolidated faceted search schema in response to at least one of a manual invocation, a predetermined invocation time interval, a creation of a new asset classification schema, and a modification of an existing asset classification schema.

15. A computer program product for allowing the performance of a faceted search upon assets, the computer program product comprising:
a non-transitory computer usable storage medium having computer usable program code embodied therewith, the computer usable program code comprising:
computer usable program code stored in the storage medium configured to identify a plurality of asset classification schemas, wherein each of the plurality of asset classification schemas defines hierarchical relationships between a classification name and a plurality of descriptive attributes, wherein the plurality of descriptive attributes are used to describe at least one asset, and wherein the plurality of asset classification schemas contain different descriptive attributes between the plurality of asset classification schemas;
computer usable program code stored in the storage medium configured to generate a consolidated faceted search schema from the plurality of asset classification schemas, wherein the consolidated faceted search schema consolidates the hierarchical relationships of each of the plurality of asset classification schemas without duplication of attributes at corresponding hierarchic levels; and
computer usable program code stored in the storage medium configured to conduct a faceted search to produce search results according to the consolidated faceted search schema.

16. A computer program product of claim 15, wherein each asset is packaged in accordance with a defined standard, and wherein the classification schema is a schema specified by the standard.

17. A computer program product of claim 16, wherein the defined standard is based upon a Reusable Asset Specification (RAS) standard.

18. A computer program product of claim 15, further comprising:
- computer usable program code stored in the storage medium configured to access the plurality of asset classification schemas;
- computer usable program code stored in the storage medium configured to transcribe a classification name of each of the plurality of asset classification schemas as an attribute of a classification facet;
- computer usable program code stored in the storage medium configured to determine whether each descriptive attribute of the plurality of asset classification schemas exists within the consolidated faceted search schema as the consolidated faceted search schema is generated; and
- computer usable program code stored in the storage medium configured to add said descriptive attribute to the consolidated faceted search schema when a descriptive attribute is nonexistent in the consolidated faceted search schema as it is being generated.

19. A computer program product of claim 15, wherein computer usable program code is configured to filter the search results according to the consolidated faceted search schema.

20. A computer program product of claim 15, wherein at least one of the plurality of descriptive attributes is contained within a classification section comprising a manifest document of the at least one asset.

* * * * *